(12) United States Patent
Ji et al.

(10) Patent No.: US 8,598,807 B2
(45) Date of Patent: Dec. 3, 2013

(54) MULTI-CHANNEL CONSTANT CURRENT SOURCE AND ILLUMINATION SOURCE

(75) Inventors: Shu Ji, Blacksburg, VA (US); Haoran Wu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 274 days.

(21) Appl. No.: 13/114,181

(22) Filed: May 24, 2011

(65) Prior Publication Data

US 2011/0291574 A1 Dec. 1, 2011

Related U.S. Application Data

(60) Provisional application No. 61/347,958, filed on May 25, 2010.

(51) Int. Cl.
  *H05B 37/02* (2006.01)
(52) U.S. Cl.
  USPC ......... 315/294; 315/200 R; 315/220; 315/312
(58) Field of Classification Search
  USPC ............. 315/187, 188, 294, 200 R, 220, 291, 315/307–309, 312
  See application file for complete search history.

(56) References Cited

U.S. PATENT DOCUMENTS

| | | | | |
|---|---|---|---|---|
| 8,120,278 B2* | 2/2012 | Choi et al. | .................... | 315/294 |
| 8,390,214 B2* | 3/2013 | Van Laanen et al. | ......... | 315/294 |
| 2010/0052568 A1* | 3/2010 | Cohen | ........................... | 315/294 |
| 2012/0007512 A1* | 1/2012 | Kim et al. | ..................... | 315/152 |
| 2012/0112649 A1* | 5/2012 | Shimura | ....................... | 315/188 |
| 2012/0286678 A1* | 11/2012 | Wu et al. | ...................... | 315/188 |

* cited by examiner

*Primary Examiner* — Don Le
(74) *Attorney, Agent, or Firm* — Whitham, Curtis, Christofferson & Cook, P.C.

(57) ABSTRACT

A multi-channel circuit having respective channels powered through transformers having primary windings connected in series allows substantially equal constant currents to be provided through all channels by cross-regulation while only a single channel need be monitored and controlled. The variation in current between channels is generally small and largely insensitive to imbalances between voltages on loads due, for example, to different numbers of LEDs in series connected strings in illumination devices and can be further reduced by inverse coupling between inductors in respective channels. Efficiency is improved through reduction in the number of stages of the constant current source since the respective channels provided both DC-to-DC conversion and constant current regulation.

22 Claims, 9 Drawing Sheets

MULTI-CHANNEL CONSTANT CURRENT SOURCE AND ILLUMINATION SOURCE

CROSS-REFERENCE TO RELATED APPLICATIONS

This application claims priority of the filing date of U.S. Provisional Patent Application Ser. No. 61/347,958, filed May 25, 2010, which is hereby fully incorporated by reference.

FIELD OF THE INVENTION

The present invention generally relates to constant current power supplies and, more particularly, constant current power supplied for driving light emitting diode (LED) arrays for illumination in which the LEDs are connected in serial strings.

BACKGROUND OF THE INVENTION

Since the development of the incandescent lamp, more efficient illumination devices have constantly been sought, along with qualities of improved light output spectrum, durability and useful lifetime. While the incandescent lamp is highly versatile in that light output flux can be varied with simple control of the power applied thereto, the efficiency of conversion of input power to light output is notoriously poor and the spectrum of light output is much different from natural sunlight and varies with input power. Incandescent lamps also have a relatively short useable lifetime and are subject to being broken or rendered inoperative from even relatively small levels of impact or vibration. Well-known fluorescent lamps provide much greater efficiency and useful lifetime but are generally of larger size and substantially fixed light output flux of generally poor spectral quality and may even be more delicate and subject to damage than incandescent lamps with the potential for release of toxic substances. Further, since fluorescent lamps are operated using a discharge of a gas, special power supplies, often of significant weight and/or bulk, are required.

In recent years, light emitting diodes (LEDs) have become a good candidate for general illumination as well as for use in selective displays and signaling. LEDs are highly efficient, of very long useful service life, extremely rugged and the spectral output for a given light output flux can be readily established by choice of the materials of the LED. Moreover, individual LEDs and small arrays of LEDs can be driven at relatively low voltages from simple power sources such as batteries or very simple power converters that can thus be of very small size, particularly where the spectral content of the output light is not of particular importance. Further, small arrays can be configured to have good uniformity of light output flux over at least a small area; making LEDs a particularly good candidate for illumination lamps and backlighting of passive display panels (e.g. liquid crystal screens). LEDs also exhibit a faster response time when energized or de-energized and do not present any significant ecological hazard.

However, to meet more general illumination requirements such as indoor or outdoor lighting of spaces of significant size and backlighting of large scale display panels, very large arrays of LEDs must be used since the light output of an individual LED is relatively small. Further, for good stability of light spectral content and to preserve the long service life of LEDs, they must be driven with a substantially constant current. Such larger arrays of LEDs are thus usually constituted by a plurality of long serially connected strings of LEDs where the number of serially connected LEDs may range from several dozen to several hundred.

Since, in operation, a given LED will exhibit a forward voltage drop when a current sufficient to cause illumination is passed through it, such strings of LEDs generally require a high DC voltage equal to the sum of all the forward voltage drops in a serially connected string of LEDs. Further, since one failure mode of an LED is to fail in a shorted condition (where no significant forward voltage drop will occur even while current is passed therethrough) the voltage which must be applied to each serially connected string of LEDs may differ markedly between the serially connected strings which comprise a given array. Thus, power supplies for larger LED arrays suitable for illumination have generally required each serially connected string of LEDs to be driven by a separate constant current power supply (e.g. a constant current supply being provided for each string of LEDs). It can be readily appreciated that the need to drive a potentially large plurality of strings of LEDs with a separate and separately controlled power supply channel for each LED string with coordination of current levels between separate constant current sources can cause an LED driver to require substantial complexity, cost and bulk, even when power factor correction and front-end DC-to-DC converter can be provided in common for all channels. Further, the use of three stages in the power supply tends to compromise the efficiency of the combination of the LED array and driver even though the energy conversion efficiency of the LEDs may be very high.

SUMMARY OF THE INVENTION

It is therefore an object of the present invention to provide a driver for a large LED array of increased efficiency and reduced weight and volume and simplified control arrangement providing enhanced regulation of power supply control.

In order to accomplish these and other objects of the invention, a multi-channel constant current source is provided comprising a power source, a plurality of transformers equal in number to the number of channels and having primary windings connected in series with each other and to the power source, and wherein the transformers have magnetizing inductances and turns ratios which are substantially equal, and a plurality of channel drivers equal in number to the number of channels, each driver circuit being connected to a secondary winding of a respective one of the plurality of transformers.

In accordance with another aspect of the invention, an illumination source is provided comprising a plurality of strings of series-connected LEDs, a power source, a plurality of transformers at least equal in number to the number of LED strings and having primary windings connected in series with each other and to said power source, wherein the transformers have magnetizing inductances and turns ratios which are substantially equal, and a plurality of channel drivers at least equal in number to the number of LED strings, each channel driver being connected to a secondary winding of a respective one of the plurality of transformers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
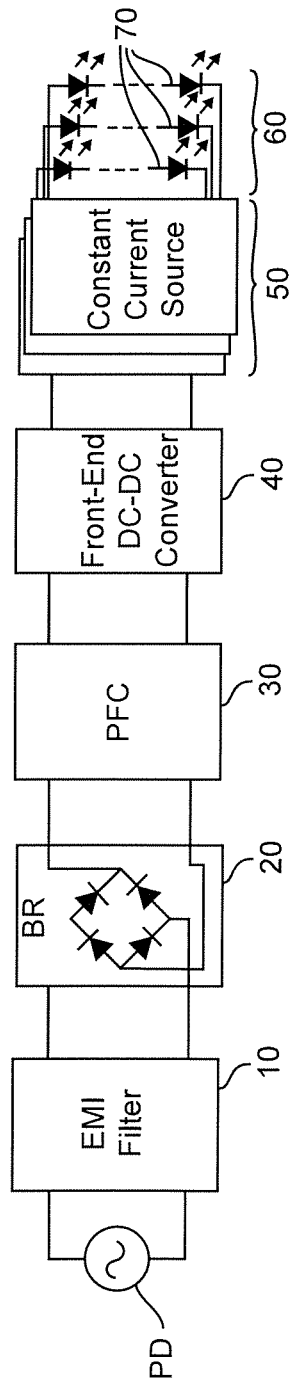
FIG. 1 is a high-level block diagram of a known architecture for a large LED array driver.
Figure 2:
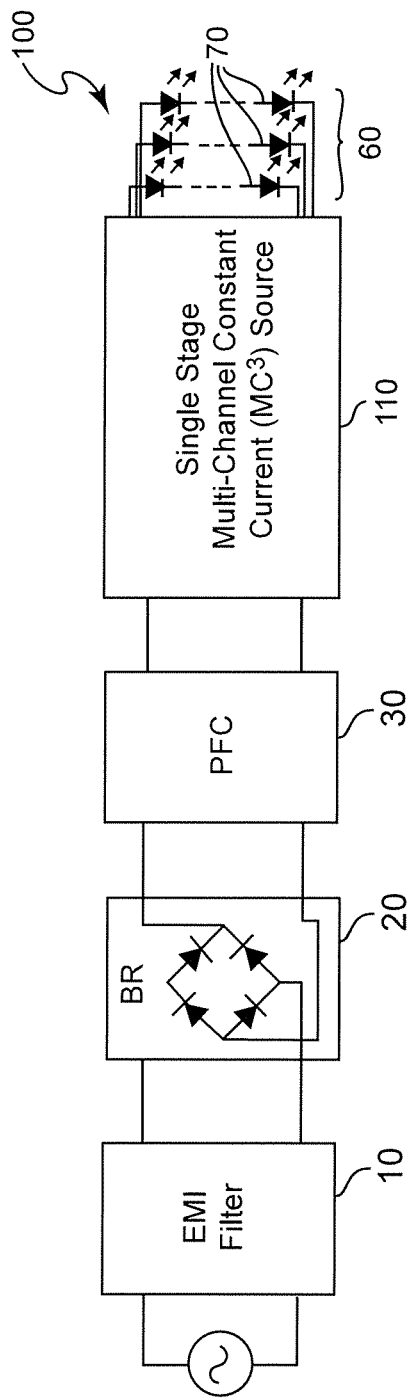
FIG. 2 is a high-level bock diagram of an architecture of the present invention.

Referring now to the drawings, and more particularly to FIG. 1, there is shown a high-level block diagram of a known architecture for an LED driver for a large LED array suitable for illumination (e.g. illumination of spaces of significant size, backlighting of large-scale display screens and the like). It is to be understood that FIG. 1 is arranged to convey an understanding of and appreciation for the basic principles of the invention and its meritorious effects as illustrated in FIG. 2. However, no portion of FIG. 1 is admitted to be prior art in regard to the present invention. It is also to be understood that references to LED arrays suitable for illumination or large LED arrays will refer to LED arrays including two or more serially connected LED strings in which the number of LEDs in a given string can effectively differ (e.g. through design/fabrication or through failure of one or more diodes in any failure mode, including shorting) by two or more from the number of LEDs in another string.

The known architecture of a multi-channel constant current LED driver type power converter, as illustrated in FIG. 1, generally comprises an electromagnetic interference (EMI) filter 10, a rectifier 20, depicted as a full-wave bridge rectifier, a power factor correction circuit 30, a front-end DC-to-DC converter 40 and a plurality of constant current source circuits 50, one for each serially connected LED string 70 forming the LED array 60. The EMI filter 10 is required to avoid switching noise from the power converter or the load from being reflected into the power distribution system, PD, if power is derived from such a system, and, in any case, to reduce radiated high-frequency noise. Similarly, the power factor correction (PFC) circuit 30 is required to isolate the load and reduce the amount of current drawn from the source for a given amount of useful power delivered to a load; thus reducing distortion and raising the effective power factor of the load. The rectifier 20 is required simply to convert alternating current (AC) power used for power distribution to direct current (DC) power which is used to power both the load and the power converter. Thus, the rectifier 20 may be omitted if a DC power source is provided (as will be assumed in the illustration and following discussion of some embodiments of the invention and, in any case, the combination of any or all of the EMI filter 10, the PFC circuit 30 and the rectifier 20, if provided, may be considered as a single power supply stage).

The particulars of EMI filter 10, rectifier 20 and PFC circuit 30 are unimportant to an understanding of the invention or the practice of the invention in accordance with its basic principles and need not be further discussed although, as will be discussed in detail below in connection with FIG. 12, some particular types of PFC circuit may be advantageous for specific applications. In any case, it should be appreciated that at least the PFC circuit 30, the front-end DC-to-DC converter 40 and the controlled current sources 50 will necessarily exhibit some significant degree of inefficiency in each of these three stages; limiting the overall, combined efficiency to a greater degree than would occur with fewer stages of similar efficiency. It should also be appreciated that constant current sources 50 must not only be individually controlled but the control must be coordinated among the current sources such that substantially the same current will be delivered to each LED string 70.

Thus, as shown in FIG. 2, the architecture of the LED driver 100 in accordance with the invention replaces the combination of front-end DC-to-DC converter and the plurality of constant current sources 50 with a single stage multi-channel constant current source 110. Thus, a two-stage architecture is provided by the invention which is potentially more efficient than the three-stage architecture of FIG. 1, Moreover, rather than requiring coordinated individual control of multiple current sources 50, a single stage multi-channel constant current source in accordance with the invention can be much more simply controlled as a single stage and single circuit that it comprises.

Figure 3:
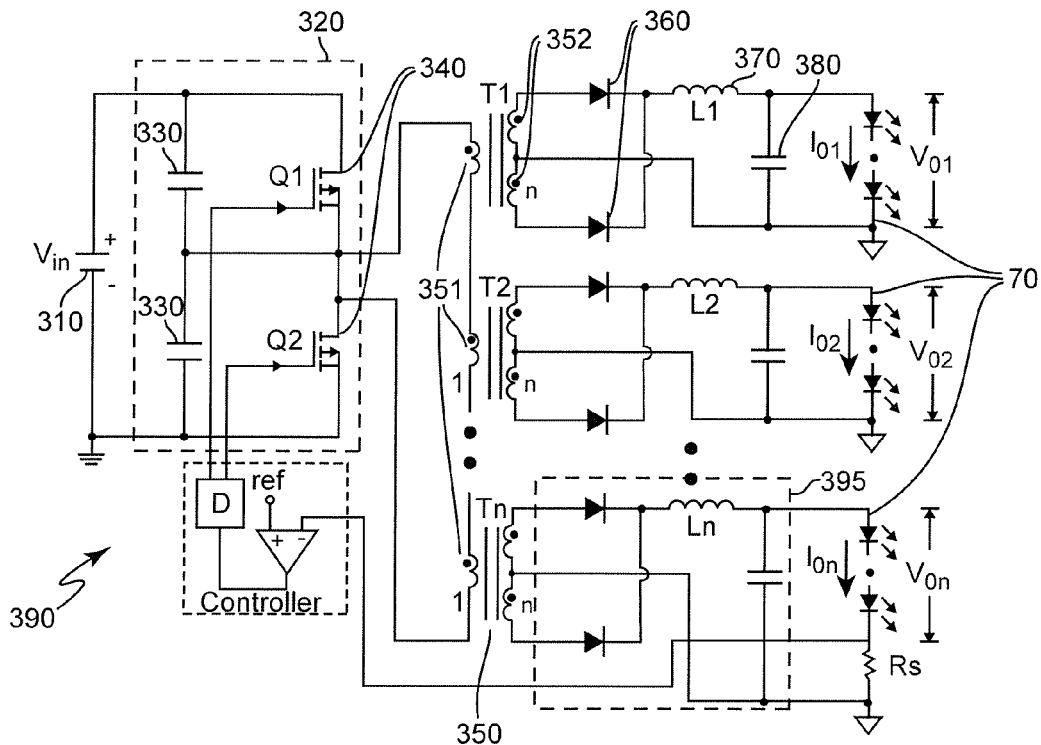
FIG. 3 is a schematic diagram of a basic embodiment of the present invention.

Referring now to FIG. 3, an exemplary embodiment of the invention is shown. As alluded to above, a DC power source 310 is assumed for simplicity and clarity of illustration but an AC power source and rectifier could be used, as described above. A traditional PFC circuit 320 comprising, for example capacitors 330 connected as a voltage divider and switches, Q1, Q2, (340) which are operated out of phase to be alternately conductive at a relatively high frequency (e.g. 300 KHz) to reverse the voltage ($V_{in}/2$) polarity applied across the serially connected primary windings 351 of transformers 350; one transformer 350 being provided for each channel corresponding to an LED string 70. Due to the high frequency switching provided by switches 340, transformers 350 may be formed by windings on toroidal cores that are very small and of low weight and volume as is the common practice in the art.

The secondary windings 352 of transformers 350 are preferably center-tapped windings that are connected to rectifiers 360, in this case, in a half-bridge circuit such that the diodes 360 will alternately conduct to supply current to inductor 370 and filter capacitor 380 to provide output current. Those skilled in the art will recognize the circuit topology of each channel as a buck converter which can operate as either a voltage regulator or a constant current supply depending on the manner in which it is driven by connection of input currents thereto in response to a monitored output. Other circuit topologies can also be used in accordance with the invention but the exemplary buck converter is chosen for illustration in the interest of simplicity and clarity. However, since the buck converter type topology is very simple and requires only a relatively few inexpensive components, it is generally preferred for most applications of the invention. Regardless of the topology employed or the components included, the basic elements thereof (e.g. rectifiers, inductor and filter as indicated by dashed line 395) will be collectively referred to as a channel driver since it is a driver constituted by a channel of a more extensive, unitary circuit, as distinct from the plurality of discrete current sources of FIG. 1.

In the multiple transformer arrangement in accordance with the invention, the primary windings of all transformers 350 are connected in series and thus the same current necessarily flows in each of the primary windings 351. This connection of the channels and constraint of identical primary winding current serves to couple the channels into a single, unitary multi-channel constant current source circuit. Assuming the magnetizing impedances of the transformers 350 are the same and the turns ratio is equal, the secondary side currents will, ideally, also be equal. Thus, a simple control strategy can be achieved in which the LED string current, Io(n), of only one channel need be monitored and controlled using, for example, a current sensing resistor Rs, an inductive sensor or the like to develop a voltage which is then fed back to control circuit 390 which controls the switching of switches 340. The remainder of the channels will thus be similarly controlled since the currents in primary windings 351 of all transformers 350 is the same as that for the channel which is directly monitored and controlled. This common control of all channels in accordance with the monitoring and control of a single channel is referred to hereinafter as current cross-regulation.

The particulars of the control circuit 390 are not important to the understanding or practice of the invention and suitable arrangements will be apparent to those skilled in the art. However, since the spectral content of light output by LEDs varies with LED string current, it is preferred that a degree of adjustability be provided by comparison of the voltage corresponding to the monitored LED string current to a reference voltage (ref) as schematically shown and the result of the comparison used to control a switch driver, D. Since only one such controller is needed in accordance with the preferred control strategy that the invention in accordance with its most basic principles allows, the cost, complexity and bulk of control circuitry is drastically reduced in the architecture of FIG. 2 as compared with that of FIG. 1. Further, by providing a single stage as a multiple channel constant current source (for a driver of two total stages), total efficiency of the LED driver in accordance with the invention is improved over the two-stage combination of a DC-to-DC converter 40 and multiple constant current sources 50 (resulting in a driver of three total stages).

It should be understood that the ideal operation of the multiple channel constant current circuit described above will only be closely approached in practical applications of the invention. In practical applications, the LED string voltages may differ from each other and will alter the constant current actually delivered to the respective LED strings 70 by the respective channels. Some divergence from ideal performance may derive from variations in the transformers or other circuit elements in the respective channels but such effects will generally be sufficiently small to be negligible. The principal reason that string voltages may significantly differ from each other is due to either differences in forward voltages of the individual LEDs in a given LED string (e.g. chip-to-chip variations in electrical characteristics) and the effective number of LEDs in a given string. That is, the number of LEDs in respective strings may differ by design and manufacture of the individual strings or one or more LEDs in a string may fail in a shorted mode (reducing the number of forward voltage drops across individual LEDs). Either or both of these possibilities will degrade the current cross-regulation of the multi-channel constant current source in accordance with the invention.

Figure 4:
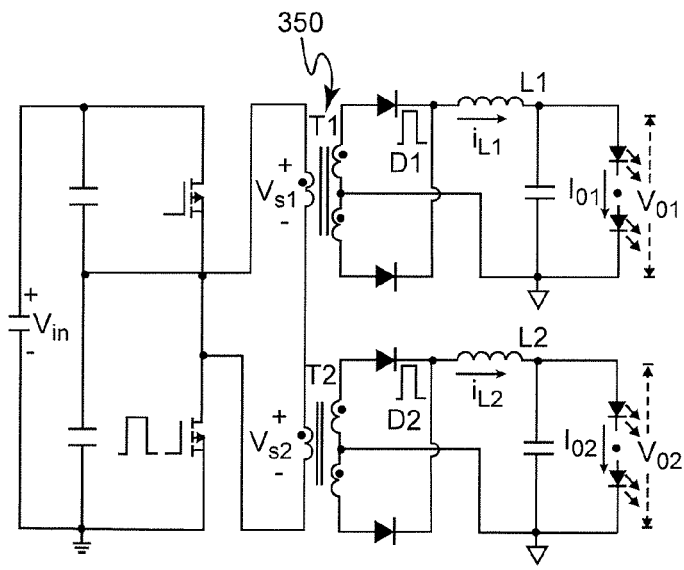
FIG. 4 is a schematic diagram of an exemplary two-channel constant current LED driver in accordance with the invention
Figure 5:
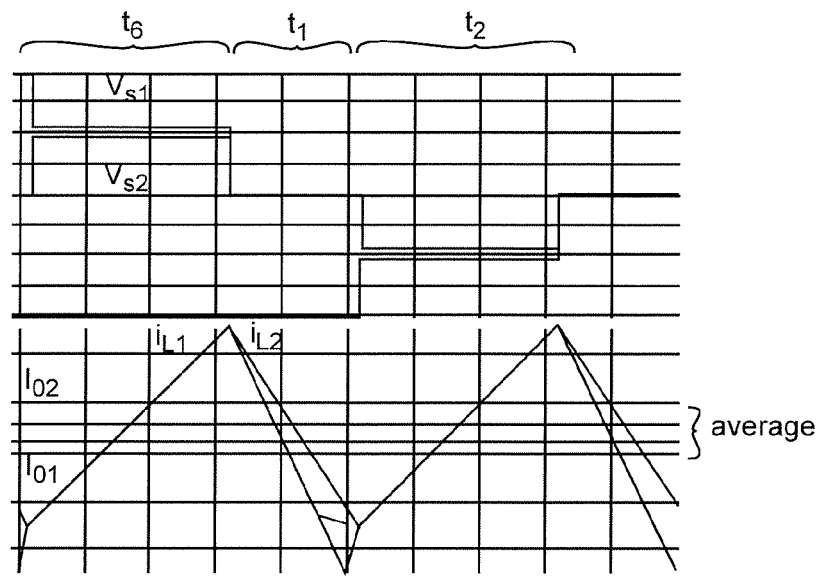
FIG. 5 is a graphical illustration of exemplary operational waveforms of the circuit of FIG. 4.

To understand why the LED string currents may significantly differ between LED strings, consider a two-channel constant current source as depicted in FIG. 4. The operating waveforms of the circuit of FIG. 4 are illustrated in FIG. 5. Assuming the LED strings are mismatched, (e.g. Vo1>Vo2), during the turn-on time, t0 or t2, of either primary side switch, T1 or T2, the transformer primary side currents are identical. Thus the secondary side currents (e.g. currents in inductors L1 and L2) are also substantially identical. However, during the turn off time t1 of both T1 and T2 (when neither switch is conductive) the slope of the decreasing current $i_{L1}$ and $i_{L2}$ in the respective inductors will differ due to the different voltages of the LED strings. Consequently, different voltages will be produced in the respective inductors, L1 and L2. When an input voltage is again applied to the serially connected primary windings, the entire voltage will first be effectively applied across the primary winding corresponding to the channel where the lower inductor voltage is present; causing the corresponding secondary side current of that channel and the voltage developed across the inductor to rise sharply in that channel until the inductor voltages in the respective channels are equal. (Conversely, the increasing primary side current cannot cause an increase in the inductor current in any channel until the secondary side transformer voltage exceeds the inductor voltage following the increase in secondary side inductor current in another channel. Thus the transformer appears, at the primary side, to be shorted with no voltage drop across the primary before the decreasing inductor current is exceeded because the current in the inductor is "free-wheeling" and developing a voltage that opposes the change in current.) As a consequence of current being supplied to one channel for a slightly longer duration than another channel, the average currents will slightly differ as shown in FIG. 5 and the spectral content of the light output by the LEDs or the respective strings will be altered accordingly. The alteration of spectral content may or may not be significant in a given application.

Figure 6:
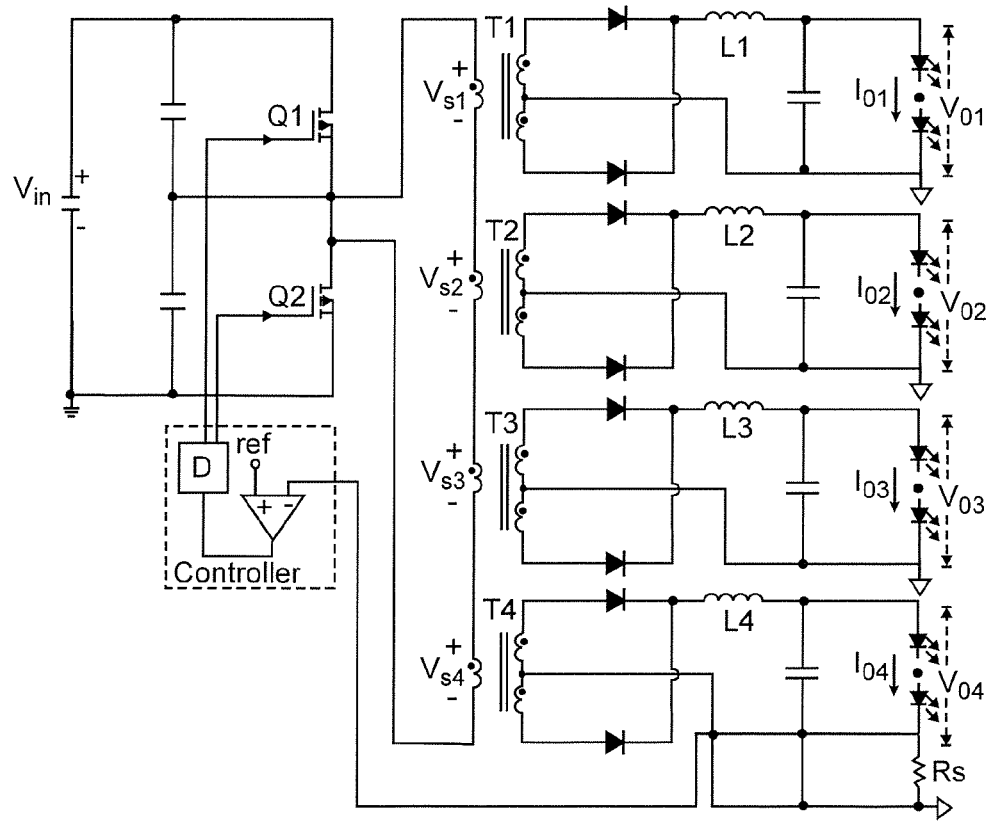
FIG. 6 is a schematic diagram of a four-channel constant current LED driver in accordance with the invention and used for simulation of the operation thereof.

To quantify this effect, the four channel constant current driver of FIG. 6 was simulated specifying mismated and unbalanced LED strings. The number of LEDs in each string, the resulting string voltages, and the average currents resulting from the simulation are given in Table I.

TABLE I

|  | No. of LEDs | Vo (V) | Io (mA) |
| --- | --- | --- | --- |
| String 1 | 15 | 55.1 | 701.8 |
| String 2 | 14 | 51.5 | 707.7 |
| String 3 | 13 | 47.9 | 713.7 |
| String 4 | 12 | 44.3 | 720.1 |

Figure 7:
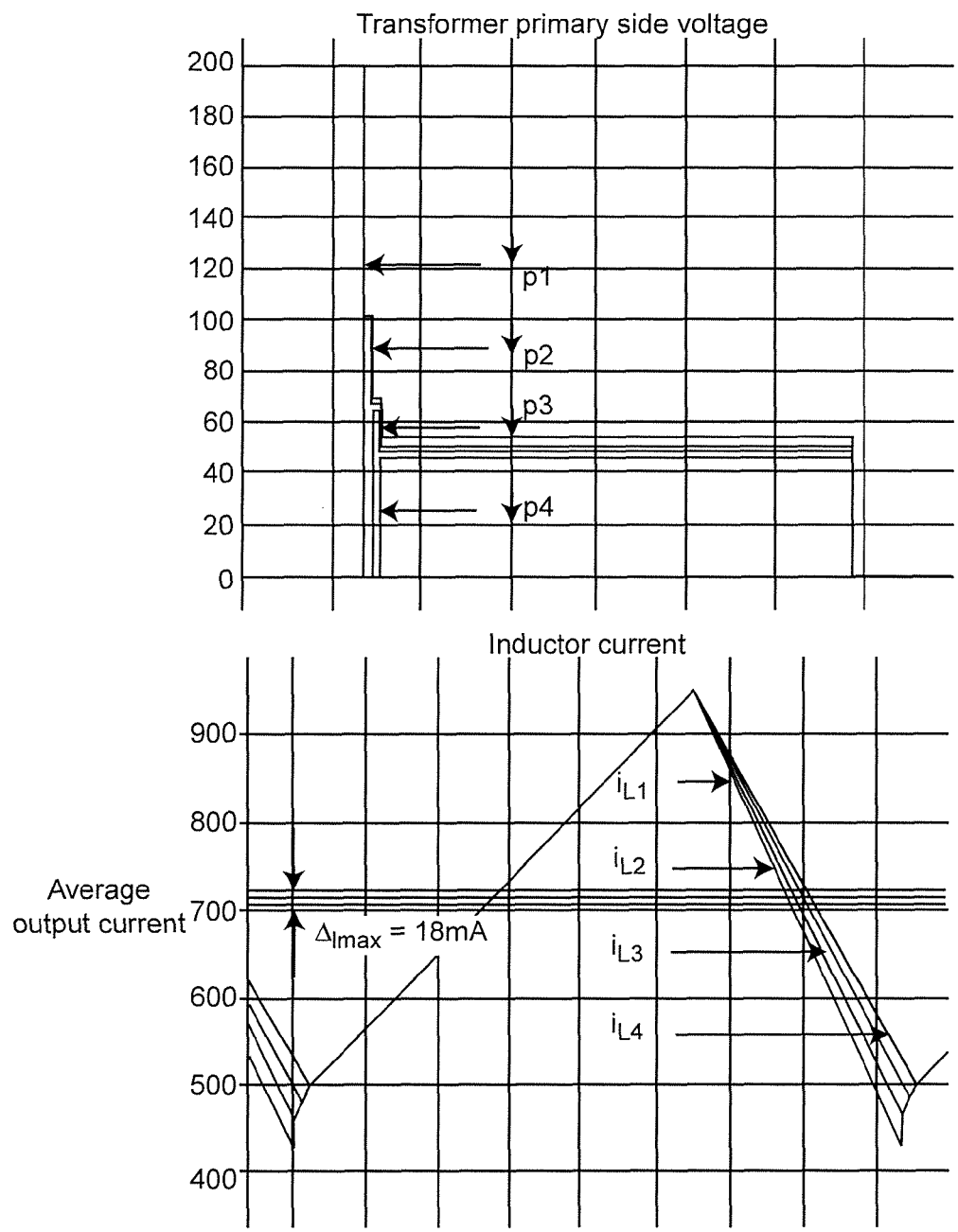
FIG. 7 illustrates simulation waveforms of the circuit of FIG. 6.

The simulation waveforms for the four-channel current source of FIG. 6 assuming an input voltage of 400v, a switching frequency of 300 KHz, an output inductance of 60 µH and a controlled LED string (LED string 4) current of 700 mA are shown in FIG. 7.

From FIG. 7 and Table I, it is clearly seen that while incremental changes in the number of LEDs can result in a nearly proportional change in the LED string voltage and that the different numbers of LEDs can result in substantial changes in LED string voltages, the change in average current between channels is relatively small. That is, comparing string 1 (15 LEDs—3.673 volts average LED voltage drop)

and string 4 (12 LEDs—3.691 volts average LED voltage drop) yields a 10 volt (about 20%) variation in LED string voltage but only about a 2.5% variation in average current. Therefore cross-regulation provided by the invention is adequate for all but the most critical spectral content applications for reasonably comparable although unequal effective numbers of LEDs per string.

Figure 8A:
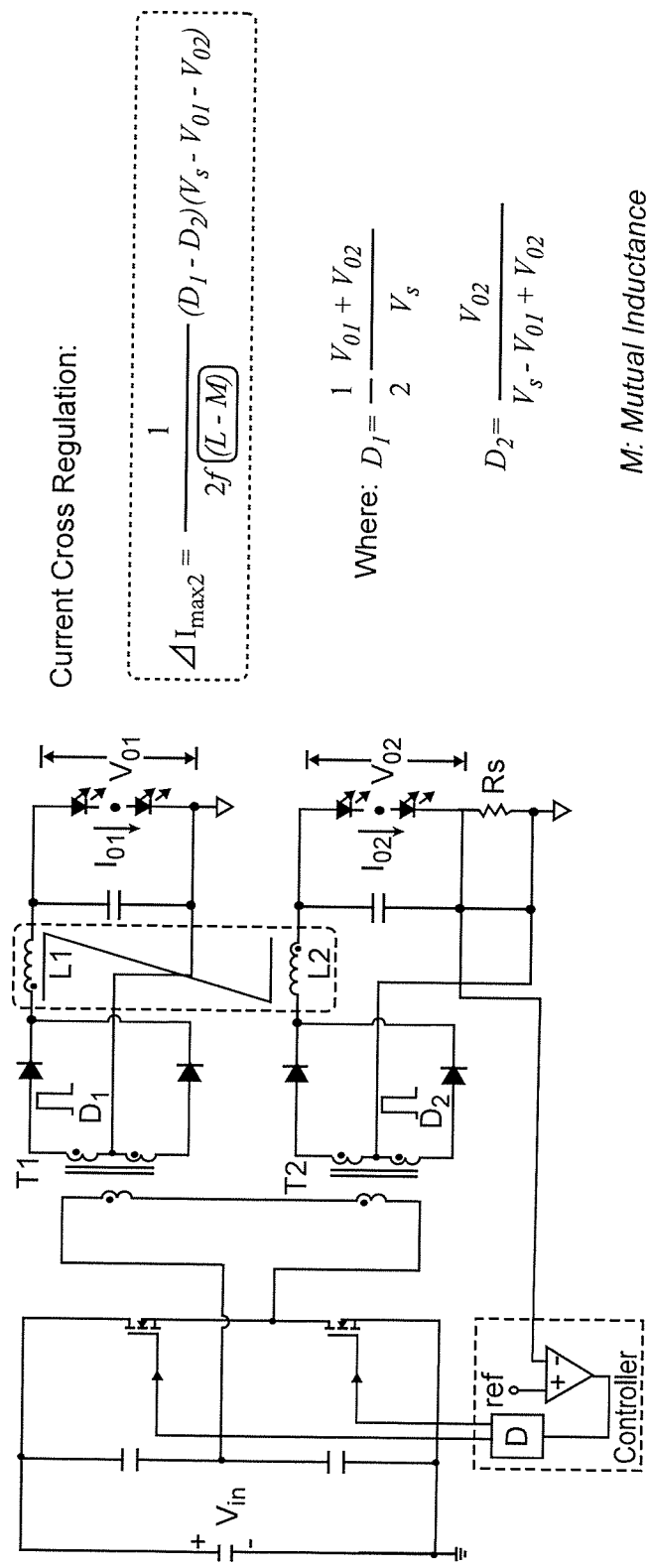
FIG. 8A is a schematic diagram of a two-channel embodiment of the invention including a perfecting feature thereof.
Figure 8B:
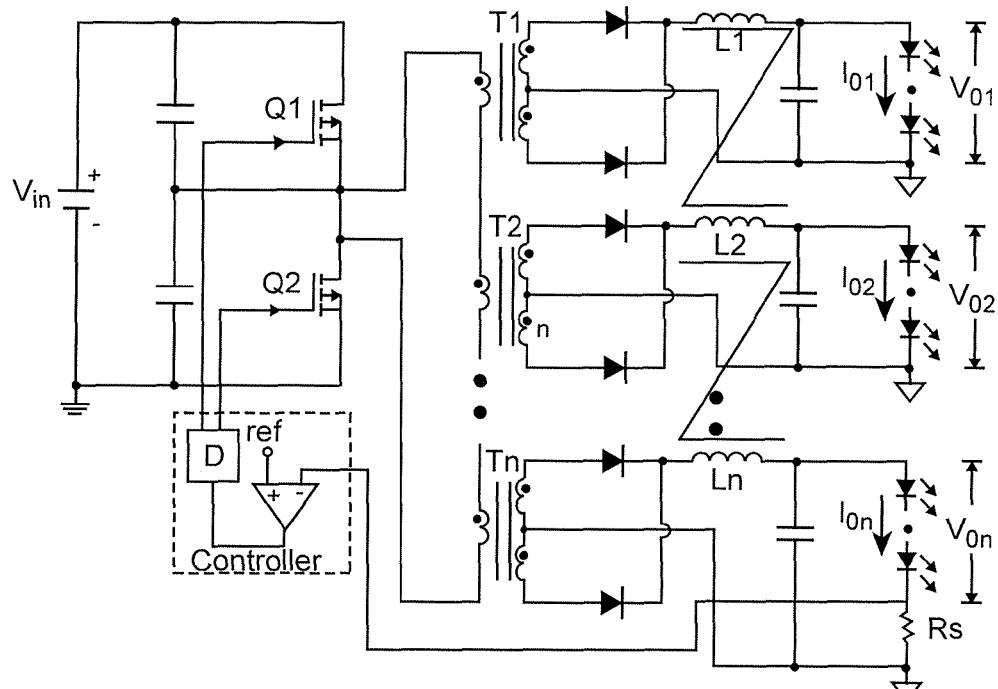
FIG. 8B is a schematic diagram illustrating the application of the perfecting feature of the invention to more than two channels.
Figure 9:
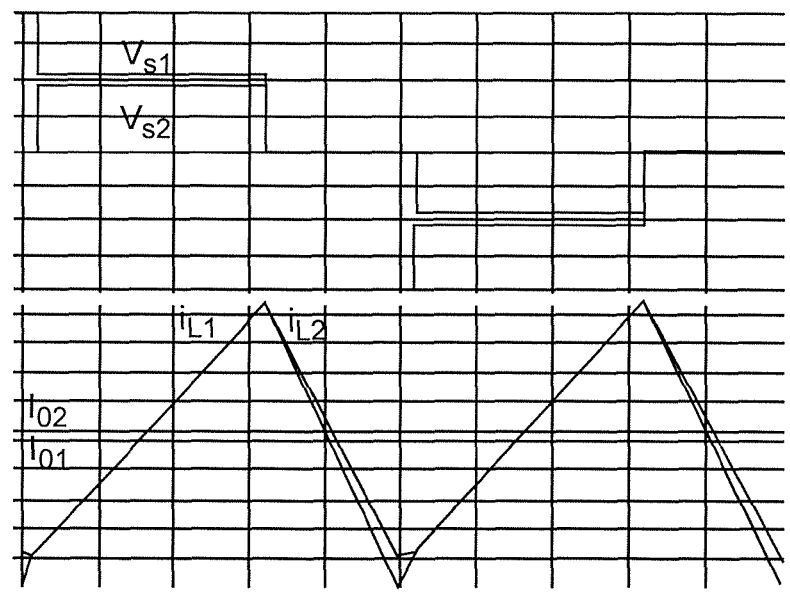
FIG. 9 is a graphical illustration of operational waveforms of the circuit of FIG. 8A

However, as a perfecting feature of the invention which is not critical to the successful practice thereof in accordance with its basic principles, the cross-regulation provided by the invention can be improved to 1.0% or less by providing inverse coupling between the inductors as depicted in the schematic diagram of FIG. 8A and the operational waveforms of FIG. 9. FIG. 8A differs from FIG. 4 only in the inverse coupling illustrated in FIG. 8A and which may be applied to any of the circuits illustrated in FIGS. 3, 4, 6 and 10-12. However, comparing the operational waveforms of FIG. 9 with those of FIG. 5 it can be seen that, depending on the degree of inverse coupling provided, the slopes of the decreasing current rates of the respective channels may be made very similar and the difference in conduction times and the differences of resulting average currents may be greatly reduced by forcing the inductor currents to follow each other even though the duty cycles (e.g. on-time) on the secondary side, D1 and D2, does not change. For the multi-channel case (e.g. where the number of channels is greater than 2), inverse coupling between channels as depicted in the schematic diagram of FIG. 8B will produce a similar effect.

As alluded to above, circuits having different topologies than the buck converter type topology illustrated can be used for the individual channels of the multi-channel constant current source of the invention as described above. The same general effects, properties and behaviors discussed above can be produced using other circuit topologies on the secondary side of the multi-channel constant current source as long as the respective channels each receive power through a transformer, the primary windings of the transformers are connected in series, the turns ratio of the transformers are equal and the magnetizing inductances of the transformers are approximately equal. Similarly, different circuit topologies other than the half-bridge input can be used on the primary side or both the primary and secondary sides of the multi-channel constant current source in accordance with the invention and may provide additional meritorious effects that may be particularly useful for some applications as will now be described with reference to three exemplary embodiments of the invention. Other variant topologies will be apparent to those skilled in the art from those which will be discussed below.

Figure 10:
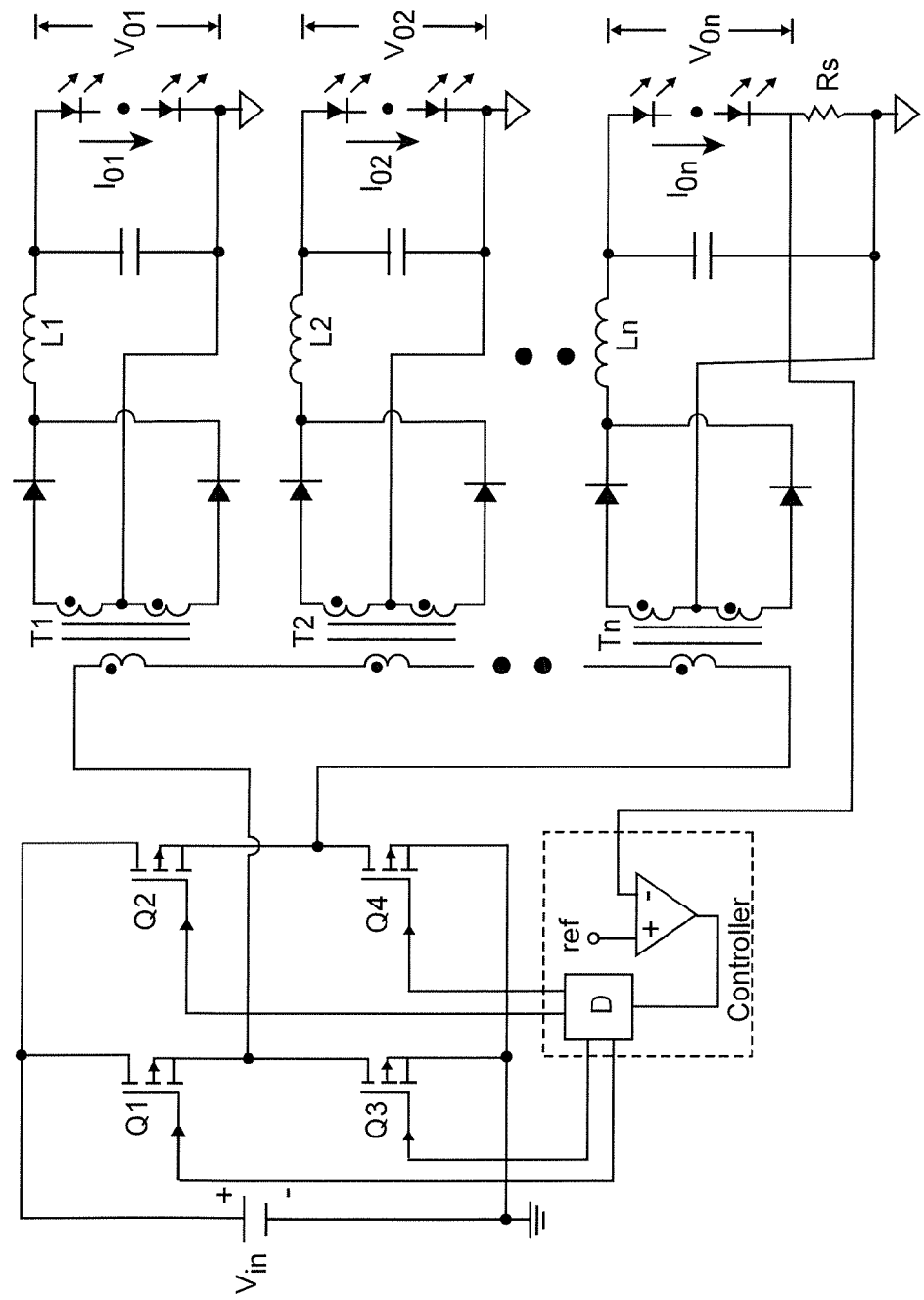
FIG. 10 is a schematic diagram of a preferred embodiment of the invention including a phase shift full bridge circuit.

Referring to FIG. 10, the input or primary side of the circuit of FIG. 3 has been replaced by a phase-shift full bridge network with a suitable switch driver as is known in the art. The secondary side and transformer connection is the same as that of FIG. 3 and inverse coupling to improve cross-regulation of current discussed above in connection with FIGS. 8A and/or 8B can be applied, if desired, although omitted from the illustration of FIG. 10.

The full bridge power input network is driven with switches Q1 and Q4 being conductive while Q2 and Q3 are non-conductive during a first time period and with Q2 and Q3 being conductive while Q1 and Q4 are non-conductive during a second time period. Such switching of the bridge network thus periodically reverses the polarity of Vin applied to the series connected primary windings and no capacitive voltage divider (e.g. 330 of FIG. 3) is required. Therefore Vin can be a lower voltage for a given number of LEDs in the LED strings than was the case for the half-bridge power input circuit of FIG. 3. Further, if the switches of each pair of switches (e.g. Q1, Q4 and Q2, Q3) are operated slightly out of phase or with at least a short interval between the periods when the respective pairs of switches are conductive, the voltage in the bridge circuit can be brought to zero and soft switching can be achieved to further increase efficiency.

Figure 11:
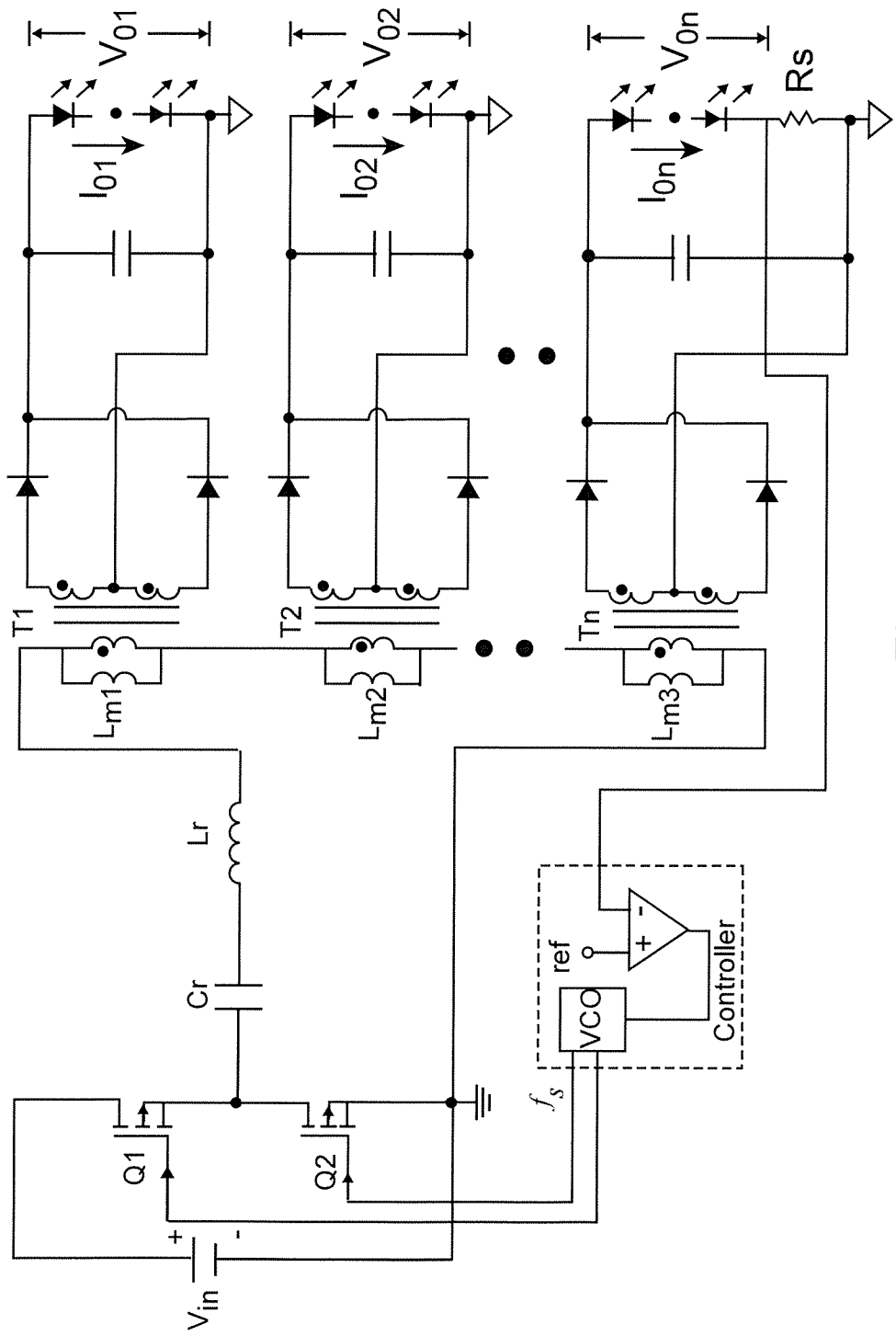
FIG. 11 is a schematic diagram of a preferred embodiment of the invention including a resonant type converter.

In the circuit of FIG. 11, a half-bridge power input circuit is provided but with an inductor, Lr, and capacitor, Cr, in series with the series connected transformer primary windings to form a resonant LLC circuit. When the switches Q1, Q2, are operated near the resonant frequency, a near sinusoidal waveform is produced and no capacitive voltage divider such as that of FIG. 3 is required. Monitoring and controlling current of only one channel with the current of the other channels controlled by cross-regulation is provided as described above. However, in this case, the controller 1110 includes a variable frequency oscillator (e.g. a voltage controlled oscillator (VCO)) to vary the switching frequency. Switch timing is also simplified and current control over a wide range can be more easily achieved with high efficiency since the peak voltage of the resonant waveform is highly sensitive to switching frequency. This circuit also provides the advantage of soft switching since the voltage waveform produced by the resonant circuit will fall to zero or near-zero when switching is to be performed. Magnetic integration of the LLC resonant circuit can also reduce size and increase power density.

Figure 12:
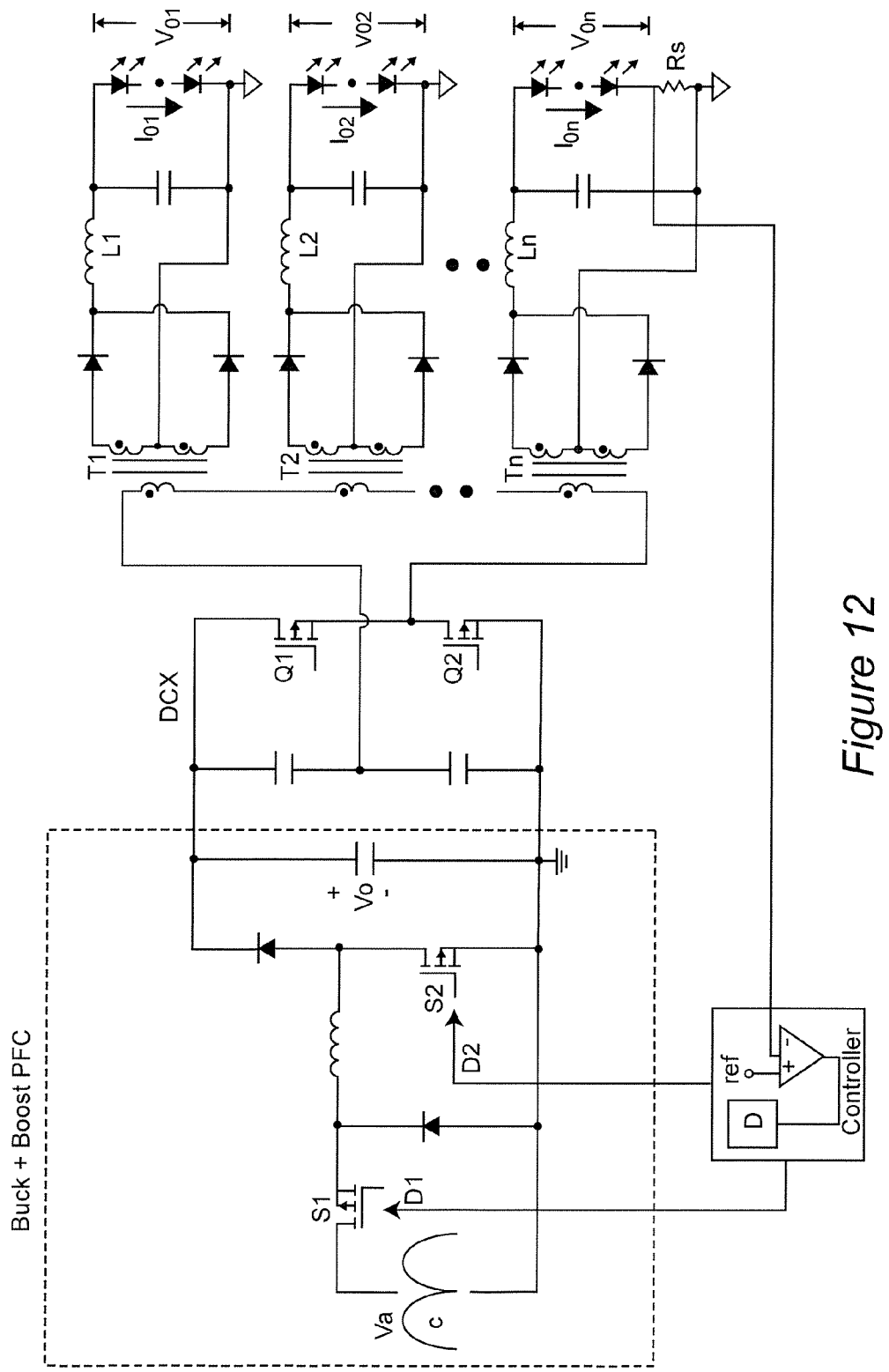
FIG. 12 is a schematic diagram of a preferred embodiment of the invention including a buck+boost PFC circuit cascaded with a half bridge bus converter.

FIG. 12 illustrates use of a buck+boost power factor correction circuit receiving input power as full-wave rectified AC power such as would be produced by a bridge rectifier 20 in FIG. 2. Those skilled in the art will recognize the combination of S1, D1 and the inductor as essentially a buck converter topology without a filter capacitor. As is known, a buck converter output voltage is necessarily less than the input voltage since the voltage developed on the inductor opposes the input voltage. Conversely, a boost converter output voltage is necessarily greater than the input voltage which is achieved by drawing a large current through the inductor to produce an increased intermittent voltage which is then rectified and filtered for application to a load. In the case of the buck+boost converter illustrated in FIG. 12, the addition of switch S2 allows manipulation of the inductor current of the buck converter topology such that a voltage either above or below the input voltage, Va, can be produced by appropriate control of both S1 and S2. For example, if S2 is maintained non-conductive, the circuit reduces to a simple buck converter and Vo<Va can be controlled entirely by S1. Conversely, conduction through S2 increases inductor current when S1 is conductive to produce an increased voltage on the inductor which is rectified and filtered by a bus converter (DCX) circuit when both S1 and S2 are turned off and the current in the inductor is "free-wheeling". The increase of inductor voltage can be readily controlled by the duty cycle of S2. Thus the buck+boost PFC circuit can provide an output voltage, Vo, that exceeds input waveform peak amplitude, Va, and the voltage Vo is readily controllable over a wide range that can be either greater or less than Va and which is sufficient for color control of the light output of the LED strings while still allowing monitoring and control of only a single channel with other channels are cross-regulated (with or without inverse coupling as described above).

In view of the foregoing, it is seen that the invention provides a simplified and inexpensive multi-channel constant current driver for LED arrays suitable for illumination. Since the driver in accordance with the invention comprises only a single stage rather than a front-end DC-to-DC converter stage and a further stage comprising a plurality of constant current sources, it is potentially more efficient. Since the multi-channel constant current source in accordance with the invention comprises a single circuit (by virtue of the series connection of transformer primary windings), the constant current level for all channels can be achieved much more simply and in a much smaller volume by directly monitoring and controlling only a single channel while the remainder of the channels are controlled through cross-regulation. The variation in constant current between channels is substantially insensitive to the number of LEDs in LED strings comprising the LED array and, as a perfecting feature of the invention, such variation can be made very small (e.g. less than 1%) through provision of inverse coupling between inductors in the respective channels. The multi=-channel constant current source of the invention can be inexpensively manufactured at a sufficiently compact size to be incorporated within compact illumination fixtures or with a display panel in a housing not significantly larger than the combination of the LED array and display panel.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A multi-channel constant current source comprising
a power source,
a plurality of transformers equal in number to the number of channels and having primary windings connected in series with each other and to said power source, said transformers having magnetizing inductances and turns ratios which are substantially equal,
a plurality of channel drivers equal in number to the number of channels, each channel driver being connected to a secondary winding of a respective one of said plurality of transformers,
a current sensor coupled to an output of at least one said channel driver, and
a controller for controlling connection of power to said plurality of series-connected primary windings of said transformers.

2. A multi-channel constant current source as recited in claim 1, wherein at least one of said channel drivers are of buck converter topology.

3. A multi-channel constant current source as recited in claim 1 wherein each said channel driver is connected to a string of series-connected LEDs.

4. A multi-channel constant current source as recited in claim 1 wherein at least one said secondary winding of said transformers is a center-tapped winding.

5. A multi-channel constant current source as recited in claim 4, wherein said center-tapped winding is connected to a half-bridge rectifier circuit.

6. A multi-channel constant current source as recited in claim 1, further including a power factor correction circuit.

7. A multi-channel constant current source as recited in claim 6, wherein said power factor correction circuit includes a resonant circuit, and said controller includes a variable frequency oscillator.

8. A multi-channel constant current source as recited in claim 6, wherein said power factor correction circuit includes a buck+boost circuit.

9. A multi-channel constant current source as recited in claim 1, wherein said current sensor is coupled to an output of only one channel.

10. A multi-channel constant current source as recited in claim 1, wherein at least two channels of said multi-channel constant current source each include an inductor.

11. A multi-channel constant current source as recited in claim 10, wherein said inductors of respective channels of said multi-channel constant current source are inverse coupled.

12. An illumination source comprising
a plurality of strings of series-connected LEDs,
a power source,
a plurality of transformers at least equal in number to the number of LED strings and having primary windings connected in series with each other and to said power source, said transformers having magnetizing inductances and turns ratios which are substantially equal,
a plurality of channel drivers at least equal in number to the number of LED strings, each channel driver being connected to a secondary winding of a respective one of said plurality of transformers,
a current sensor coupled to an output of at least one said channel driver, and
a controller for controlling connection of power to said plurality of series-connected primary windings of said transformers.

13. An illumination source as recited in claim 12, wherein at least one of said channel drivers are of buck converter topology.

14. An illumination source as recited in claim 12, wherein said power source includes
an alternating current power source,
a rectifier, and
an electromagnetic interference filter.

15. An illumination source as recited in claim 12 wherein at least one said secondary winding of said transformers is a center-tapped winding.

16. An illumination source as recited in claim 15, wherein said center-tapped winding is connected to a half-bridge rectifier circuit.

17. An illumination source as recited in claim 12, further including a power factor correction circuit.

18. An illumination source as recited in claim 17, wherein said power factor correction circuit includes a resonant circuit, and said controller includes a variable frequency oscillator.

19. An illumination source as recited in claim 17, wherein said power factor correction circuit includes a buck+boost circuit.

20. An illumination source as recited in claim 12, wherein said current sensor is coupled to an output of only one channel.

21. An illumination source as recited in claim 12, wherein at least two channels of said illumination source each include an inductor.

22. An illumination source as recited in claim 21, wherein said inductors of said respective at least two channels of said illumination source are inverse coupled.

* * * * *